(12) United States Patent
Hudson et al.

(10) Patent No.: US 9,673,583 B2
(45) Date of Patent: Jun. 6, 2017

(54) PHOTOVOLTAIC MOUNTING RAIL CONNECTOR WITH DROP-DOWN CONNECTION TO FIRST PHOTOVOLTAIC MODULE AND SLIDE-IN CONNECTION TO SECOND PHOTOVOLTAIC MODULE

(71) Applicant: SolarCity Corporation, San Mateo, CA (US)

(72) Inventors: Tyrus Hudson, San Rafael, CA (US); Martin Seery, San Rafael, CA (US); River Broussard, San Rafael, CA (US); Malcolm Kimberley, London (GB)

(73) Assignee: SOLARCITY CORPORATION, San Mateo, CA (US)

( * ) Notice: Subject to any disclaimer, the term of this patent is extended or adjusted under 35 U.S.C. 154(b) by 0 days.

(21) Appl. No.: 14/986,033

(22) Filed: Dec. 31, 2015

(65) Prior Publication Data
US 2017/0063007 A1    Mar. 2, 2017

Related U.S. Application Data

(60) Provisional application No. 62/211,330, filed on Aug. 28, 2015.

(51) Int. Cl.
| *H01R 4/66* | (2006.01) |
| *H01R 25/14* | (2006.01) |
| *H01R 4/64* | (2006.01) |
| *H01R 43/16* | (2006.01) |
| *H02S 30/10* | (2014.01) |

(52) U.S. Cl.
CPC ............. *H01R 25/142* (2013.01); *H01R 4/64* (2013.01); *H01R 43/16* (2013.01); *H02S 30/10* (2014.12)

(58) Field of Classification Search
CPC ........ H01R 25/142; H01R 4/64; H01R 43/16; H01R 4/36; H01R 4/248; H01R 4/363; H01R 4/2483; H01R 4/5091; H01R 4/38; H02S 30/10
USPC ........................................................ 439/100
See application file for complete search history.

(56) References Cited

U.S. PATENT DOCUMENTS

| 4,512,119 A | 4/1985 | Willoughby | |
| 6,040,525 A * | 3/2000 | Chauquet | H01R 4/363 174/40 CC |
| 6,959,520 B2 | 11/2005 | Hartman | |
| 7,683,254 B2 * | 3/2010 | Shimizu | H01R 4/64 174/40 CC |
| 7,690,083 B2 | 4/2010 | Ramsauer | |

(Continued)

FOREIGN PATENT DOCUMENTS

| CN | 201839228 U | 5/2011 |
| CN | 201887681 U | 6/2011 |

(Continued)

*Primary Examiner* — Jean F Duverne
(74) *Attorney, Agent, or Firm* — Kilpatrick Townsend & Stockton LLP

(57) ABSTRACT

A connector for attaching first and second photovoltaic modules to a mounting rail, with a lower body portion that rotates to lock into a mounting rail groove and an upper body portion with a hook that is lowered towards the lower body portion to grasp onto the first photovoltaic module and a key that receives the second photovoltaic module slidably-connected thereon.

20 Claims, 14 Drawing Sheets

(56) References Cited

U.S. PATENT DOCUMENTS

| | | | |
|---|---|---|---|
| 7,708,234 B2 * | 5/2010 | Kossak | F16B 2/065 |
| | | | 248/229.23 |
| 7,797,883 B2 | 9/2010 | Tarbell et al. | |
| 7,861,485 B1 | 1/2011 | Wentworth et al. | |
| 7,862,390 B2 * | 1/2011 | Copper | H01R 4/5091 |
| | | | 439/781 |
| 7,866,099 B2 | 1/2011 | Komamine et al. | |
| 8,002,573 B2 * | 8/2011 | Elsaesser | H01R 4/2483 |
| | | | 439/416 |
| 8,109,048 B2 | 2/2012 | West et al. | |
| 8,122,648 B1 | 2/2012 | Liu | |
| 8,146,299 B2 | 4/2012 | Stearns et al. | |
| 8,176,693 B2 | 5/2012 | Abbott et al. | |
| 8,191,321 B2 | 6/2012 | McClellan et al. | |
| 8,250,829 B2 | 8/2012 | McPheeters et al. | |
| 8,317,526 B2 * | 11/2012 | Gardner | H01R 4/36 |
| | | | 24/489 |
| 8,317,549 B2 * | 11/2012 | Falchetti | H01R 11/283 |
| | | | 439/762 |
| 8,375,654 B1 | 2/2013 | West et al. | |
| 8,464,987 B1 * | 6/2013 | DeCesare | H02G 3/34 |
| | | | 24/458 |
| 8,720,131 B2 | 5/2014 | Urban et al. | |
| 8,756,881 B2 | 6/2014 | West et al. | |
| 8,763,978 B2 | 7/2014 | Newman et al. | |
| 8,776,456 B1 | 7/2014 | Schrock | |
| 8,904,718 B2 | 12/2014 | Schick et al. | |
| 8,962,973 B2 | 2/2015 | Sinicco et al. | |
| 9,097,443 B2 * | 8/2015 | Liu | F24J 2/5258 |
| 9,166,524 B2 | 10/2015 | West et al. | |
| 9,266,478 B2 * | 2/2016 | Patel | B60R 9/045 |
| 2002/0064978 A1 * | 5/2002 | De France | H01R 4/38 |
| | | | 439/100 |
| 2005/0044807 A1 | 3/2005 | Rillie et al. | |
| 2011/0000525 A1 | 1/2011 | Wu et al. | |
| 2011/0001030 A1 | 1/2011 | Hochreiter et al. | |
| 2012/0102854 A1 | 5/2012 | Meier et al. | |
| 2012/0301661 A1 | 11/2012 | West et al. | |
| 2014/0053891 A1 | 2/2014 | West et al. | |
| 2014/0175244 A1 | 6/2014 | West et al. | |
| 2015/0075100 A1 | 3/2015 | West et al. | |
| 2015/0143760 A1 | 5/2015 | Daniels | |
| 2016/0268958 A1 * | 9/2016 | Wildes | H02S 20/23 |

FOREIGN PATENT DOCUMENTS

| | | |
|---|---|---|
| CN | 202189802 U | 4/2012 |
| CN | 202796986 U | 3/2013 |
| CN | 103348490 A | 10/2013 |
| DE | 102006025036 B4 | 4/2008 |
| DE | 102012011563 A1 | 12/2013 |
| EP | 2592365 A2 | 5/2013 |
| EP | 2721354 B1 | 12/2014 |
| FR | 2956681 A1 | 8/2011 |
| JP | 2007051439 A | 3/2007 |
| JP | 5291693 B2 | 9/2013 |
| WO | 2013119218 A1 | 8/2013 |

* cited by examiner

PHOTOVOLTAIC MOUNTING RAIL CONNECTOR WITH DROP-DOWN CONNECTION TO FIRST PHOTOVOLTAIC MODULE AND SLIDE-IN CONNECTION TO SECOND PHOTOVOLTAIC MODULE

CROSS-REFERENCE TO RELATED APPLICATIONS

This claims the benefit of priority to U.S. Provisional Application No. 62/211,330, titled "PHOTOVOLTAIC MOUNTING RAIL CONNECTOR WITH DROP-DOWN CONNECTION TO FIRST PHOTOVOLTAIC MODULE AND SLIDE-IN CONNECTION TO SECOND PHOTOVOLTAIC MODULE" and filed on Aug 28, 2015, which is herein incorporated by reference in its entirety. This further incorporates by reference in their entireties U.S. patent application Ser. No. 14/986,025 titled "SUPPORT SYSTEM FOR PHOTOVOLTAIC MOUNTING RAIL HAVING CYLINDRICAL BASE THAT ROTATES INTO A LOCKED POSITION" and U.S. patent application Ser. No. 14/986,039 titled "TILE AND SLATE ROOF FLASHING SYSTEMS", both being filed concurrently on the same day as this application.

TECHNICAL FIELD

This relates to photovoltaic mounting systems, and to systems for securing photovoltaic modules onto mounting rails.

BACKGROUND

For some installations of solar panel arrays, the method of mounting and connecting photovoltaic modules can be restricted to an order of operations such that installation techniques appropriate for roof structures built by relatively modern construction standards are not appropriate or safe for roof structures built according to relatively older or traditional construction standards. Thus, some solar panel arrays require the use of mounting rails to support and mount photovoltaic modules, where the mounting rails can accommodate the order in which photovoltaic modules must be mounted.

Accordingly, there is a need a method of mounting photovoltaic modules, and related structure for mounting photovoltaic modules, that is appropriate for use with mounting rails constructed and configured to support a solar panel array on roof structures built according to relatively older or traditional construction standards.

BRIEF SUMMARY

The present system provides for a connector that can be positioned on a mounting rail to support a first photovoltaic module on one side and a second photovoltaic module on another side. The first photovoltaic module is supported and/or secured by a drop-down connection and the second photovoltaic module is supported and/or secured by a slide-in connection.

An advantage of the present system is that the connector according to various embodiments can be manually attached onto a first photovoltaic module, and then a second photovoltaic module can be slid into an opposite side of the connector. Since the second photovoltaic module can be attached to the connector by a sliding attachment, it is not necessary for an installer to touch the connector to attach the second photovoltaic module thereto. As a result, the installer can proceed to install a row of photovoltaic modules without ever having to reach back over any one of the installed modules as the installer moves along the row. This approach saves time and energy during the installation process, and minimizes a risk of damage to the second photovoltaic module that may arise from reaching back over the installed second photovoltaic module. This may be particularly useful in applications that require a rail because the roof itself cannot support the weight of an installer other than at the rail attachment points.

Installation of the present system is quick and easy. First, the installer positions the connector at a preferred location along the mounting rail. Then, the installer simply rotates this connector by ninety degrees. When the connector is rotated, a pair of arms on the lower portion of the connector can lock into a groove in the mounting rail. In addition, the ninety-degree rotation of the connector will position a hook on an upper portion of the connector at a position at which it can be dropped down into a groove on the side of the first photovoltaic module. After this drop-down connection has been made to the first photovoltaic module, the connector will be securing the first photovoltaic module onto the mounting rail in a position such that the connector is ready to receive the second photovoltaic module (to be slid thereon); the connection to the second photovoltaic module can be accomplished by a specially shaped key portion of the connector and its associated grounding spring mechanism.

The present connector is easy to use. Only minimal tooling is required to install a photovoltaic array onto mounting rails using the present connector. For example, a first tool (e.g. a wrench) may be used to rotate the connector by ninety-degrees into a preferred position such that it locks into the groove in the mounting rail. A second tool, (e.g.: a screwdriver) can then be used to lower the top portion of the connector with respect to the bottom portion of the connector, thereby moving the connector down into a position in which it's hook securely holds an edge of the first photovoltaic module onto the mounting rail.

In one aspect, the present system provides a connector for attaching first and second photovoltaic modules to a mounting rail. The system may include a lower body portion having a pair of lower arms extending from opposite sides of the lower body portion, and a pair of upper arms extending from opposite sides of the lower body portion. The system may also include an upper body portion having a hook and a key extending from opposite sides of the upper body portion; and a fastener connecting the upper body portion onto the lower body portion. The fastener adjusts the separation distance between the upper and lower body portions of the connector such that the hook can be lowered to connect onto a first photovoltaic module prior to a second photovoltaic module being pivot-connected onto the key.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

DETAILED DESCRIPTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

As used herein, certain terms identify the relative connections of structural element of the present system. In particular, the term "drop down" refers to a coupling of two structural elements where one structure clamps down on the other. Similarly, the term "slide-in" refers to a coupling of two structural elements where a first structure laterally moves into a receiving region of the second structure.

It can be understood that while the examples shown herein focuses on coupling two photovoltaic modules to a single mounting rail via a connector, for a solar panel array, each photovoltaic module can be supported upon two or more mounting rails as appropriate to distribute the weight of the array. Accordingly, the present connector system and structure is not limited to merely a single mounting rail of an overall solar panel array deployment.

Figure 1A:
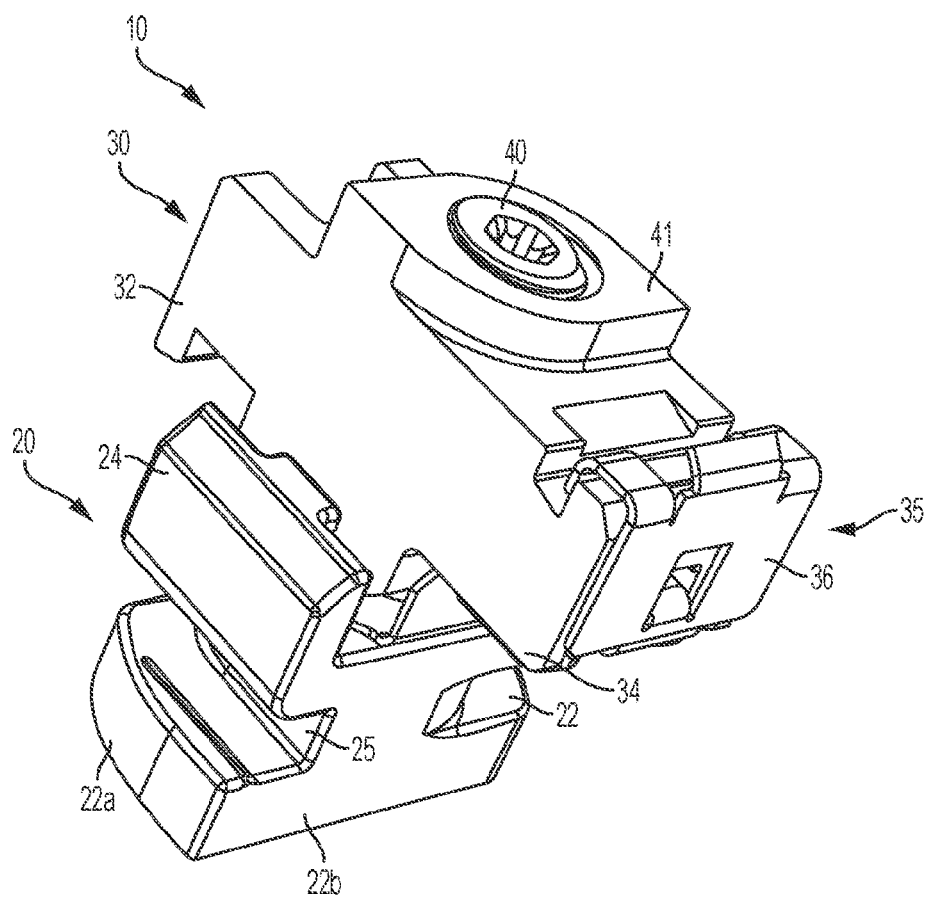
FIGS. 1A to 1F are various perspective views of the connector, according to aspects of the present disclosure.
Figure 1B:
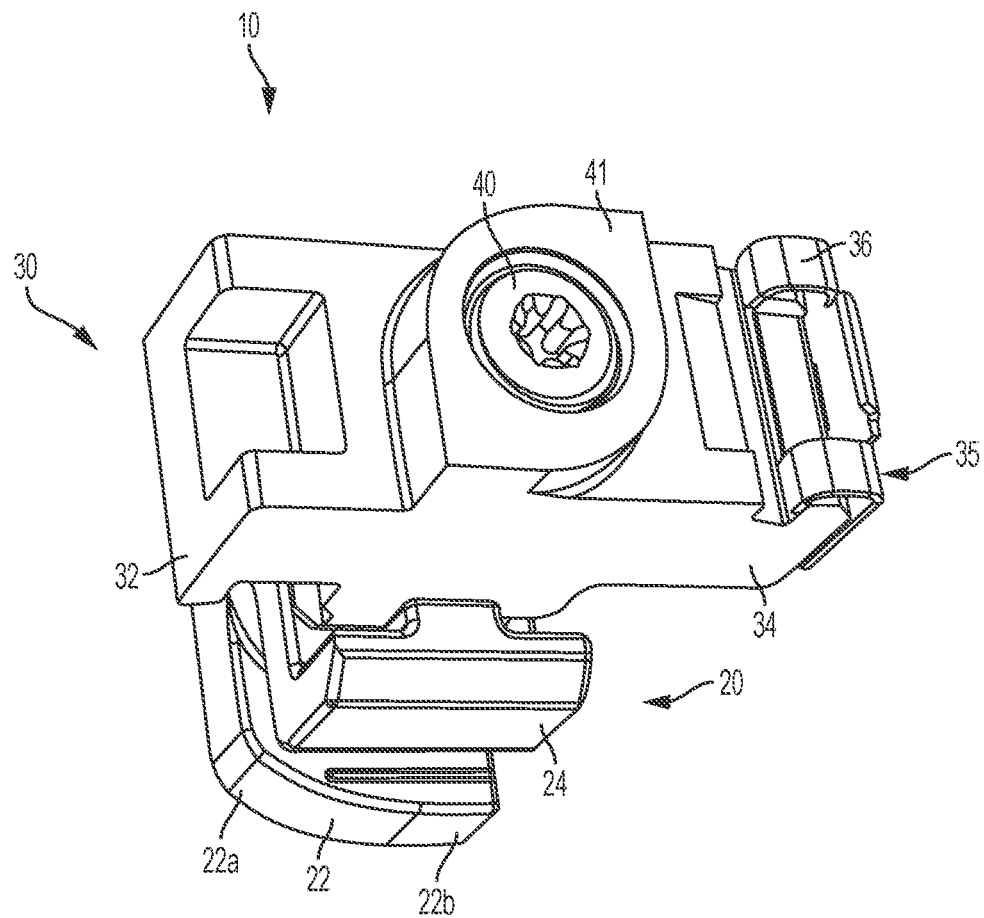
Figure 1C:
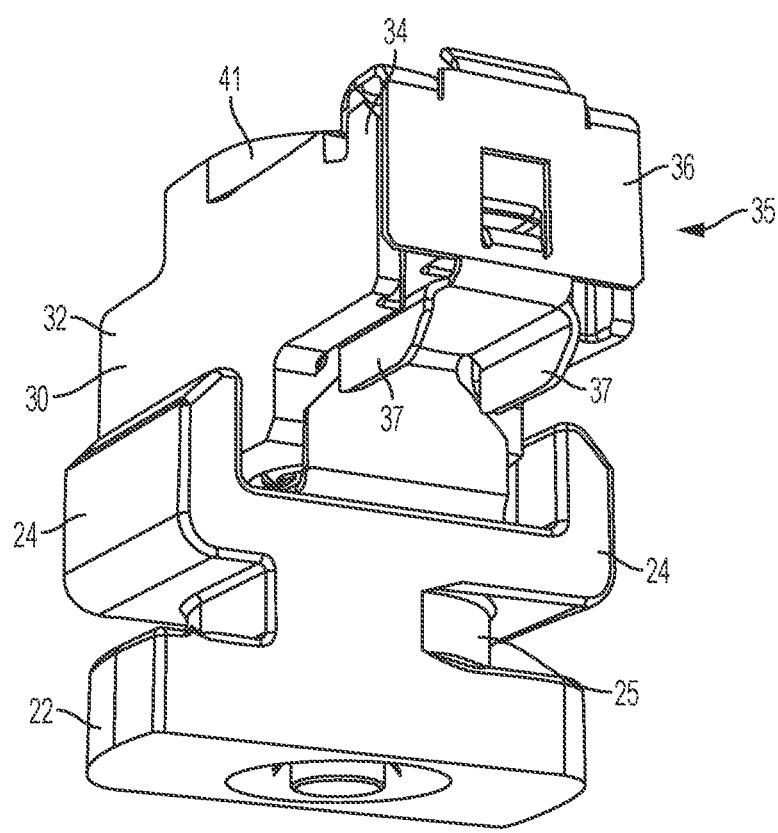
Figure 1D:
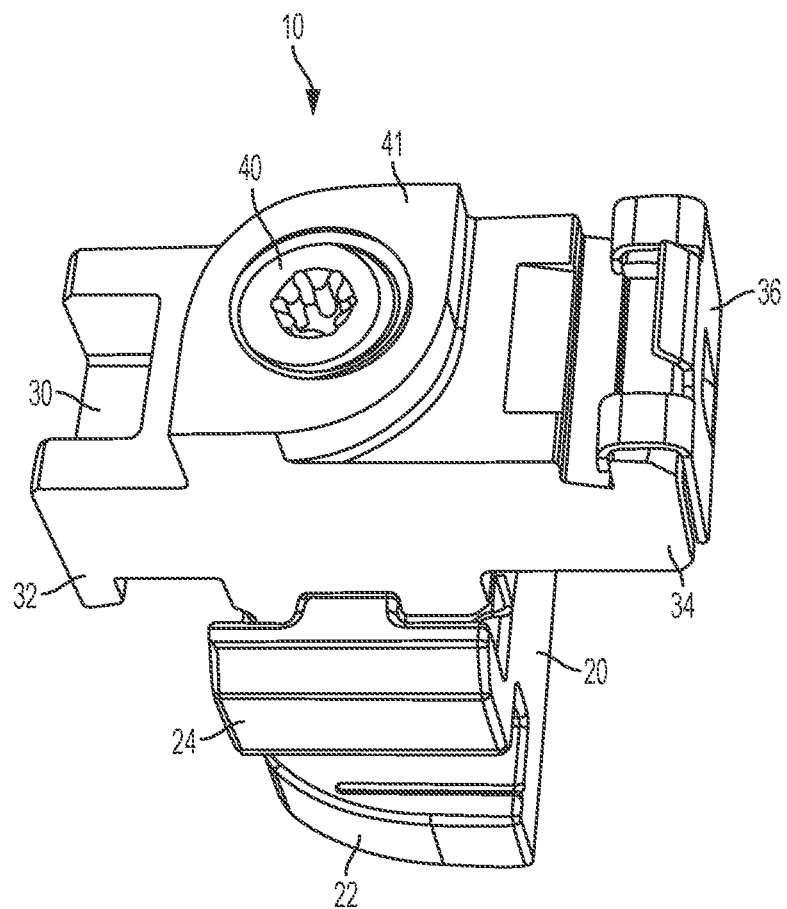
Figure 1E:
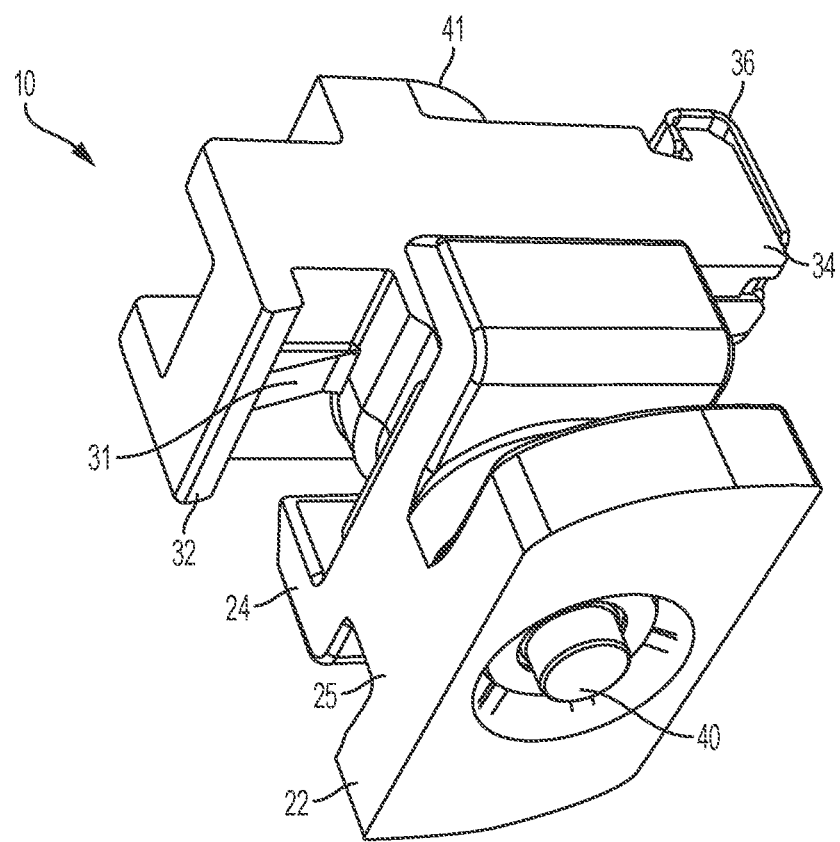
Figure 1F:
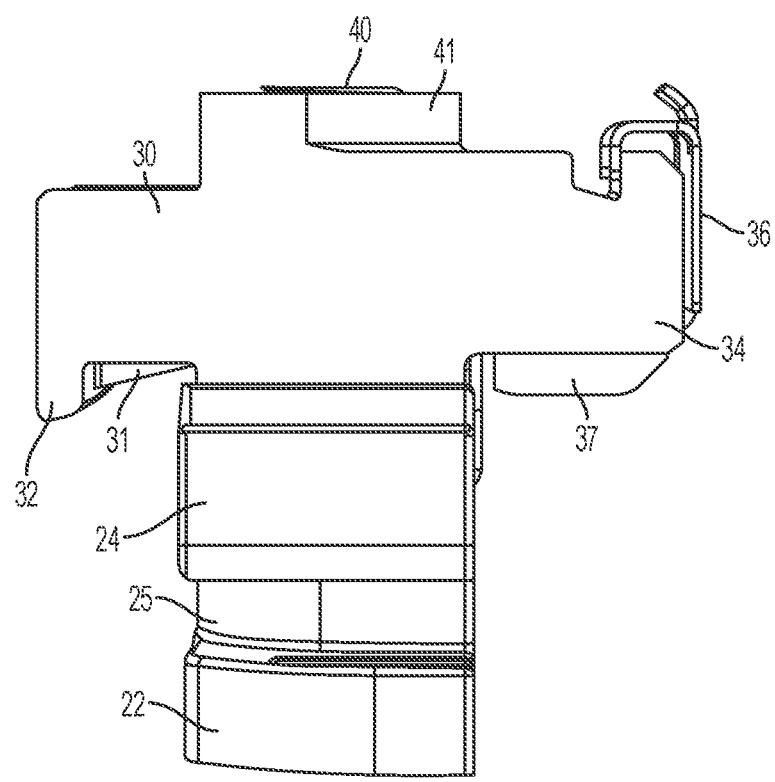
Figure 2:
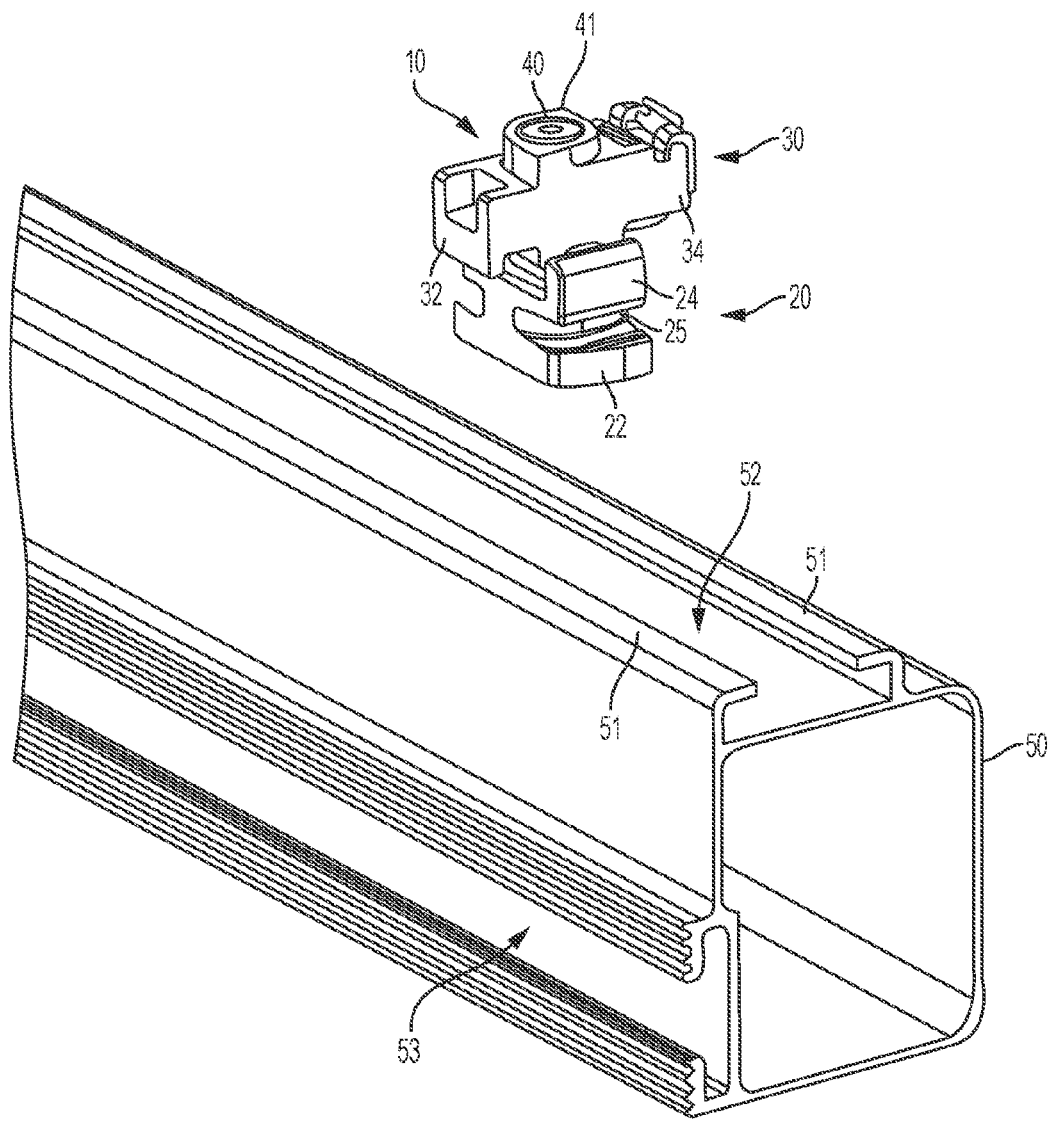
FIG. 2 is a perspective view of the connector prior to insertion into a mounting rail groove, according to aspects of the present disclosure.
Figure 3:
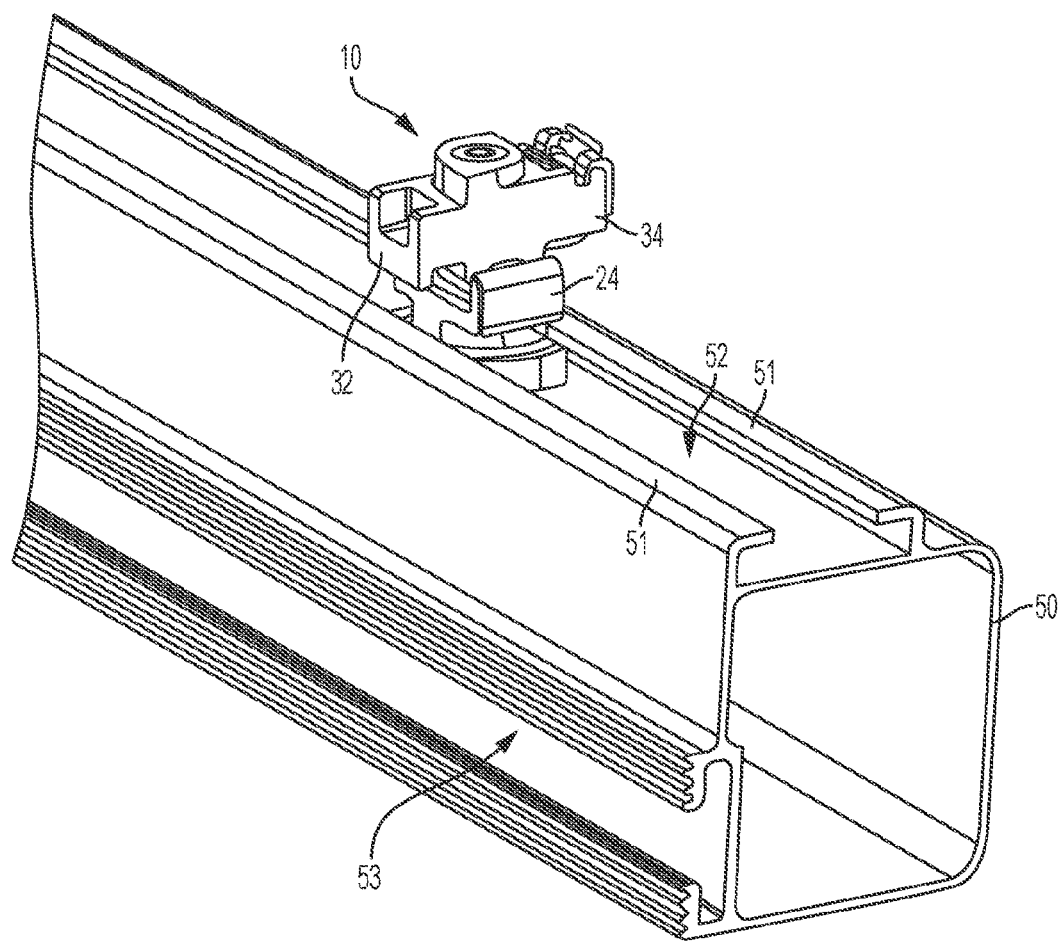
FIG. 3 is a perspective view of the connector after its insertion in the mounting rail groove, but prior to rotation into a locked position, according to aspects of the present disclosure.
Figure 4:
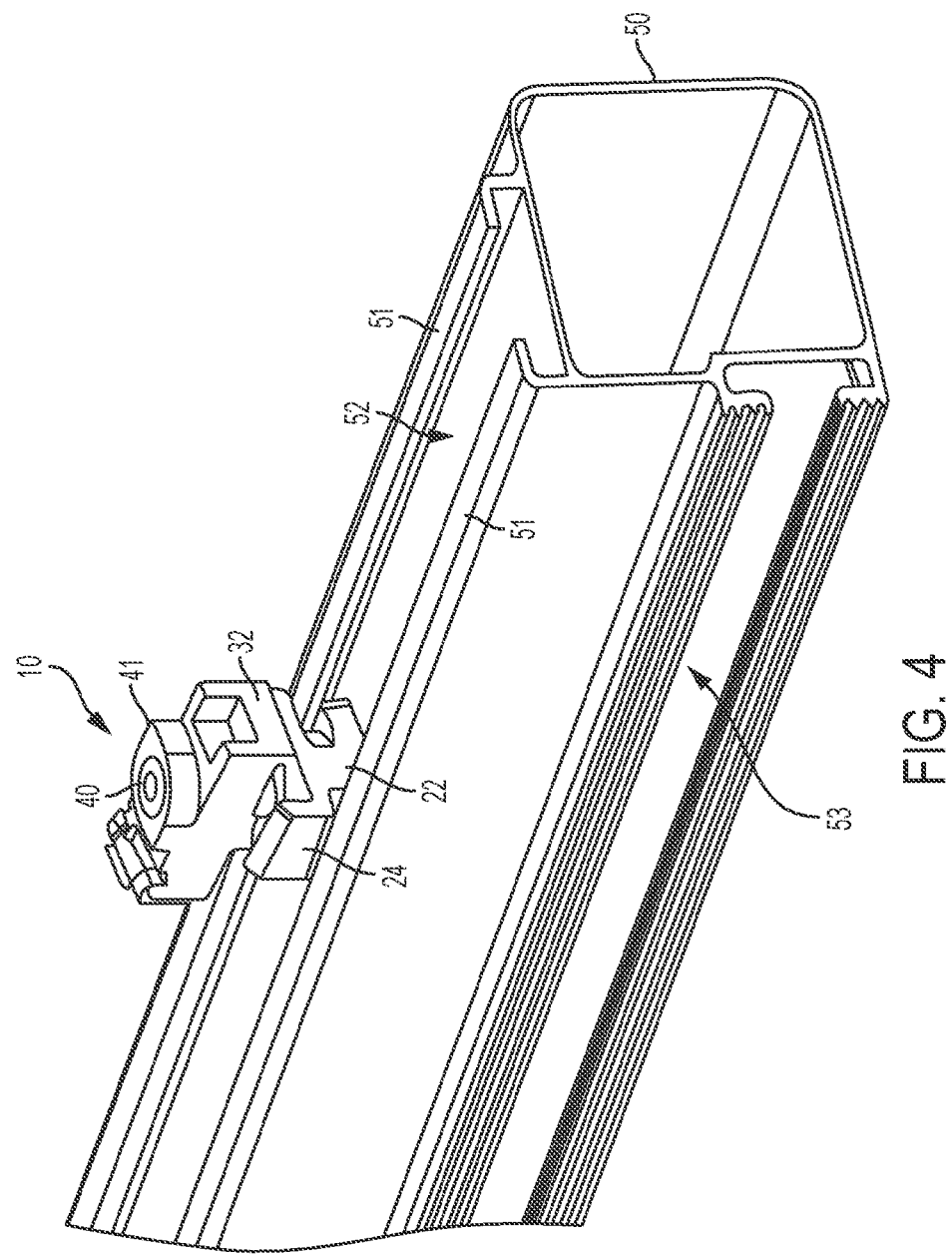
FIG. 4 is a perspective view of the connector after its insertion in the mounting rail groove, but after rotation into a locked position in the mounting rail, according to aspects of the present disclosure.
Figure 5:
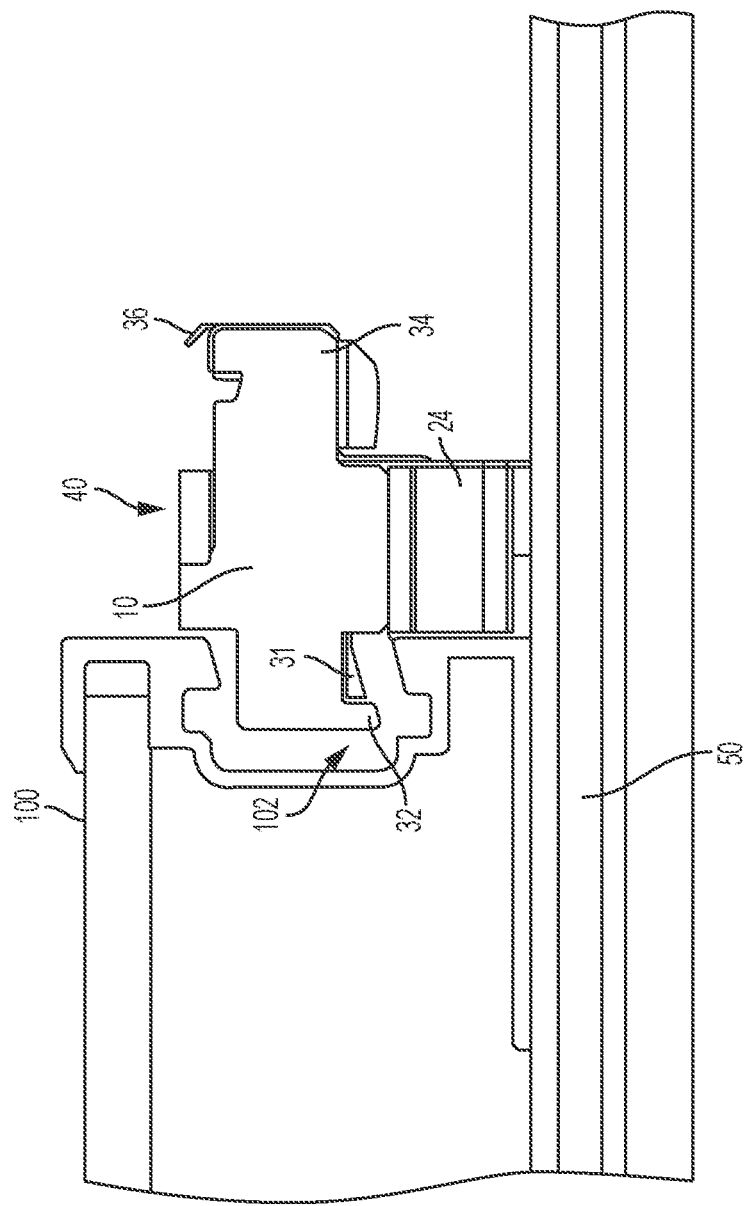
FIG. 5 is a side elevation view of the connector with the upper portion in a raised position, prior to attachment onto the first photovoltaic module, according to aspects of the present disclosure.
Figure 6:
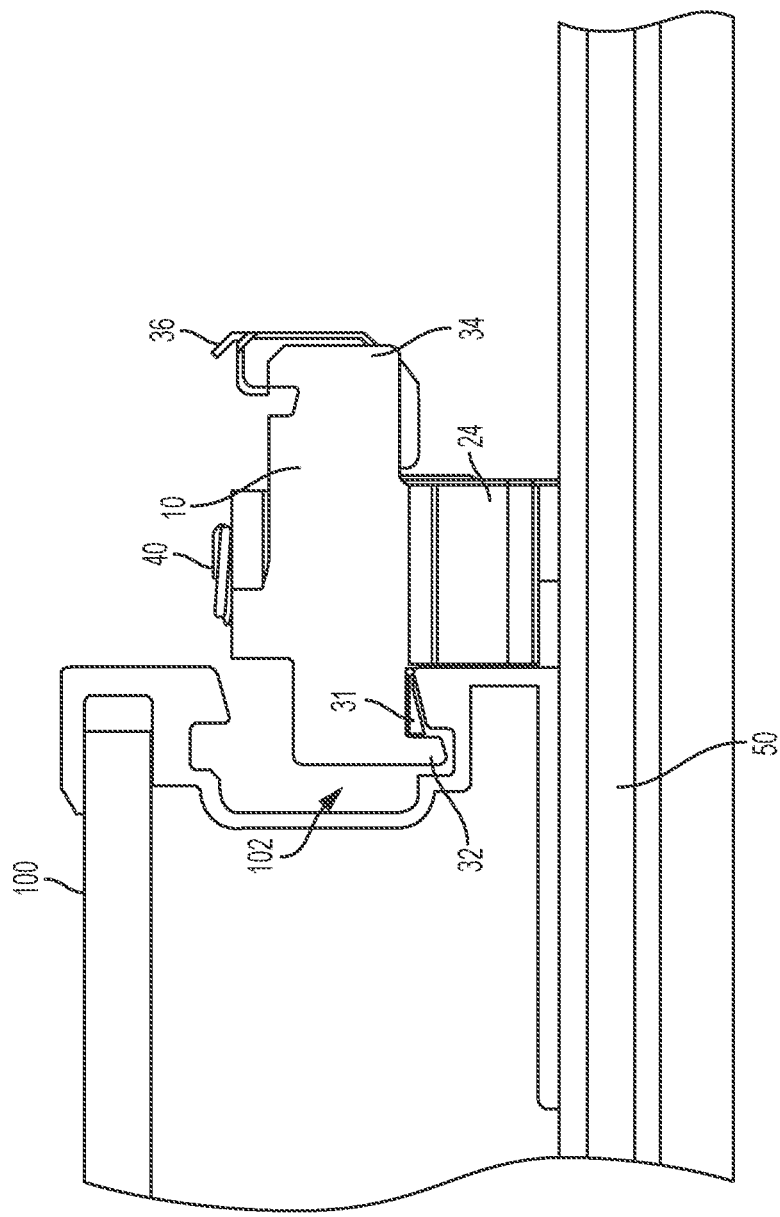
FIG. 6 is a side elevation view of the connector with the upper portion in a lowered position, showing a hook on the upper portion grasping onto a first photovoltaic module, according to aspects of the present disclosure.
Figure 7:
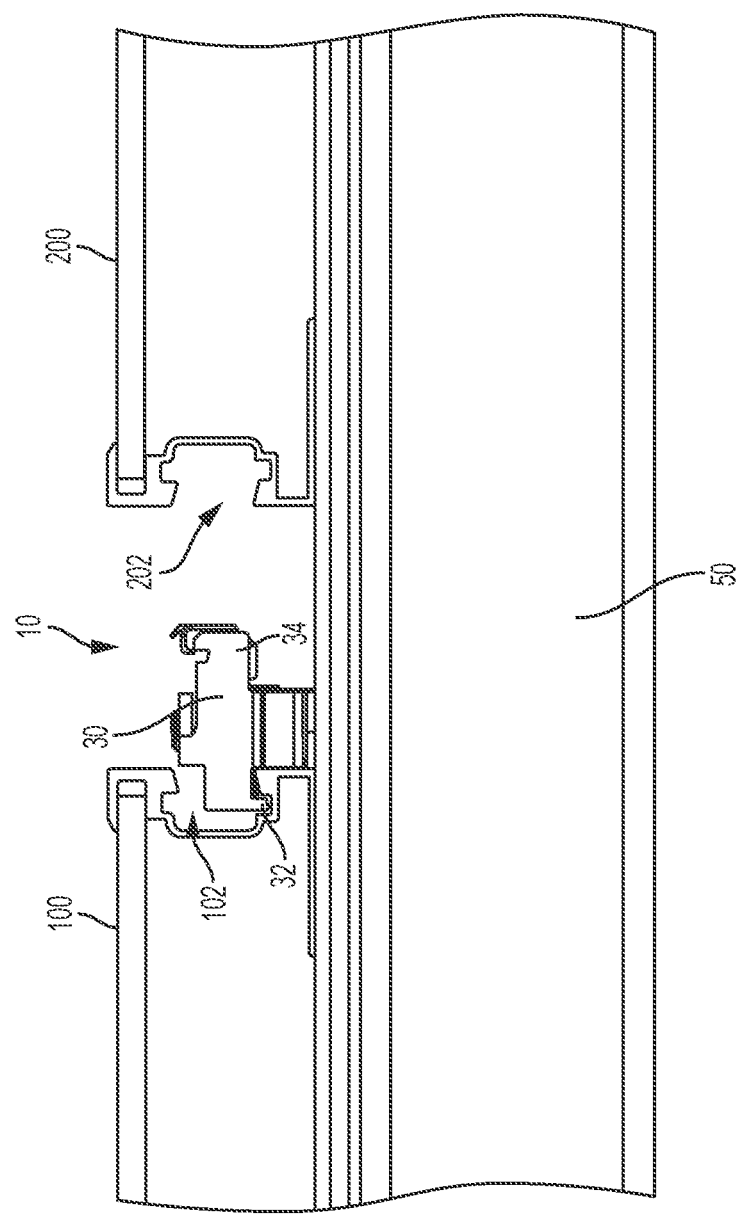
FIG. 7 is a side elevation view of the connector showing a second photovoltaic module about to be slid onto the key on the connector, according to aspects of the present disclosure.
Figure 8:
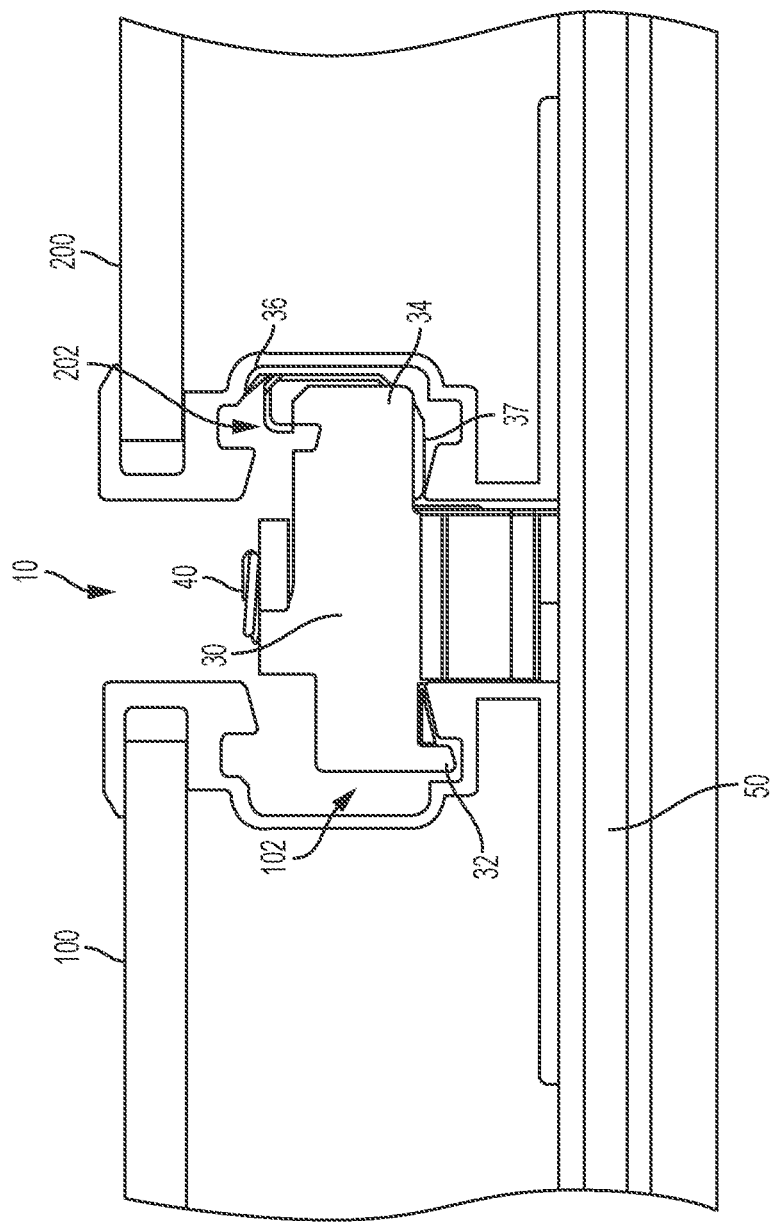
FIG. 8 is a side elevation view of the connector showing the second photovoltaic module attached thereto after the second photovoltaic module has been slid onto the key of the connector, according to aspects of the present disclosure.
Figure 9:
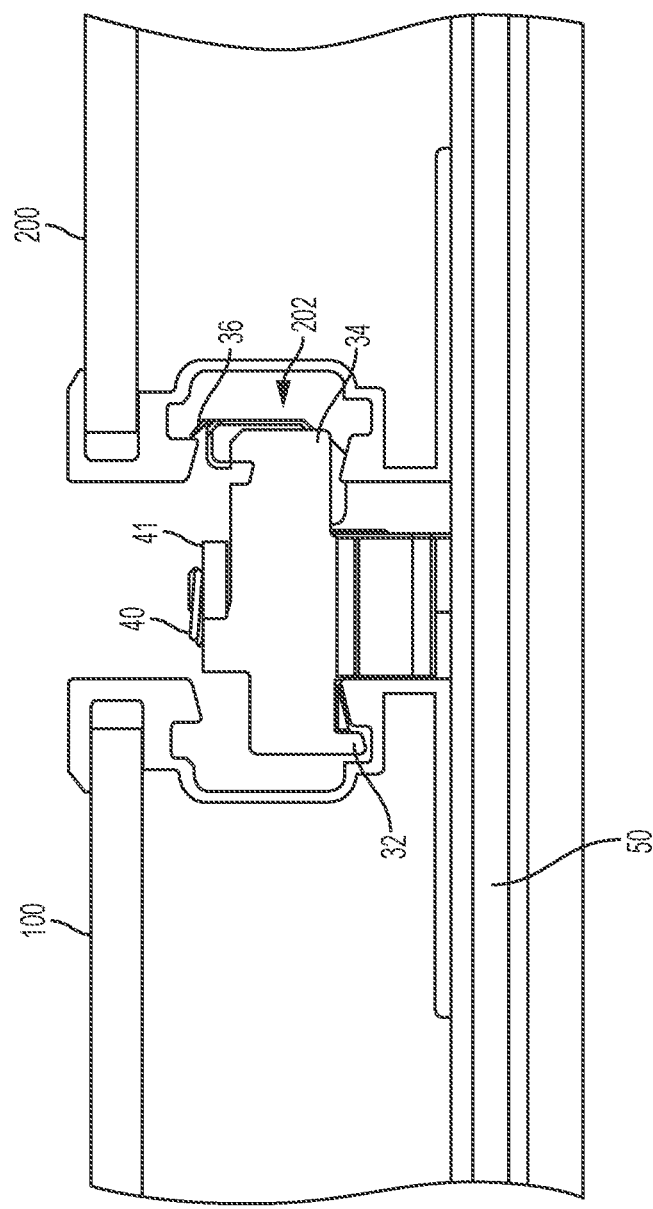
FIG. 9 is a side elevation view of the connector, showing the key portion providing restraint against the second photovoltaic module slipping off of the connector, according to aspects of the present disclosure.

FIGS. 1A to 1F show six various perspective views of the present connector as viewed from different angles. FIGS. 2 to 4 show rotational attachment of the connector onto a mounting rail. FIG. 5 and FIG. 6 show drop-down attachment of the connector to the first photovoltaic module. FIG. 7 and FIG. 8 show sliding-connection attachment of the connector to the second photovoltaic module. Lastly, FIG. 9 shows the spring on the key portion resisting the second photovoltaic module from sliding off of the connector.

Referring first to FIGS. 1A to 1F, the present system provides connector 10 for attaching first and second photovoltaic modules (100 and 200, respectively, in FIG. 6 and FIG. 7) to mounting rail 50. The present system for connector 10 can include lower body portion 20, upper body portion 30, and fastener 40 connecting upper body portion 30 onto lower body portion 20. Lower body portion 20 can have lower arms 22 extending from opposite sides of lower body portion 20 (at the bottom of lower body portion 20), and upper arms 24 also extending from opposite sides of lower body portion 20 (from the top of lower body portion 20). Upper body portion 30 can have hook 32 and key 34 extending from opposite sides of upper body portion 30. As is shown, upper arms 24 can be positioned directly above lower arms 22 on lower body portion 20. Mid-body region 25 of lower body portion can be positioned between lower arms 22 and upper arms 24.

In various aspects, each of lower body portion 20 and upper body portion 30 of connector 10 can be formed of materials as known in the industry, including but not limited to metals, alloys, or plastics. In some aspects, either or both of lower body portion 20 and upper body portion 30 can be formed of aluminum or an aluminum alloy. In other aspects, either or both of lower body portion 20 and upper body portion 30 can be formed of stainless steel. Similarly, fastener 40 can be formed of a metal or alloy as known in the field.

Further, connector 10 can include spring 35 as a member positioned in between lower body portion 20 and upper body portion 30. In particular, spring 35 can have a leaf region having a hole therethrough such that leaf region of spring 35 can be secured between lower body portion 20 and upper body portion 30 where fastener 40 passes through that hole. Spring 35 can further include spring clip 36 and lower projections 37. Spring clip 36 can be configured in part to conform to and curl around the shape of key 34. Lower projections 37 can be configured and arranged to protrude downward relative to key 34. In some aspects, spring 35 can be formed of metals or alloys as known in the industry, and in particular aspects spring 35 can be formed of stainless steel.

Considered in further detail, lower arms 22 of lower body portion 20 can have rounded corners 22a opposed along one diagonal axis of lower arms 22, and further lower body portion 20 can have square corners 22b opposed along the other diagonal axis of lower arms 22. As seen below, rounded corners 22a can allow for lower body portion 20 (and by extension the overall system of connector 10 as a whole) to rotate within a groove of mounting rail 50. Conversely, square corners 22b can prevent lower body portion 20 from rotating beyond ninety degrees (90°) of rotation within a groove of mounting rail 50. Further, upper arms 24 of lower body portion 20 can be shaped to project upward from mid-body region 25, and can be dimensioned to fit above flanges 51 of mounting rail 50 groove 52, as described in further detail below.

Upper body portion 30 can be considered as having two functional sides, a first side having the structure of hook 32 configured to clamp onto and secure a frame of a first photovoltaic module, and a second side having the structure of key 34 configured to insert sideways into a frame of a second photovoltaic module. While the frame structure of both the first and second photovoltaic modules may be the same, the opposing sides of upper body portion 30 connects to the frame structure in different ways. The difference in how hook 32 and key 34 couple with the frame structure of a photovoltaic modules allows for assembly of solar panel arrays according to a specific or particular order of operations. The present system thereby provides for efficiency in that no special variation is needed between sides of photovoltaic module frames, or between frames of alternating photovoltaic modules, to allow connector 10 to couple adjacent photovoltaic modules of a solar panel array.

Considering hook 32 of upper body portion 30, the structure of hook 32 is configured and dimensioned to fit over a lower lip of a photovoltaic module frame groove, where when situated within a photovoltaic module frame groove, hook 32 can extend downward toward the bottom of that photovoltaic module frame groove. Further, upper body portion 30 can have lower incline 31 positioned on the underside of upper body portion 30 next to the downwardly extending part of hook 32. Lower incline 31 can be formed and angled to match with a lip surface of a photovoltaic module frame groove.

Considering key 34 of upper body portion 30, and spring 35 connected thereto as part of connector 10, the structure of key 34 is configured and dimensioned to fit laterally into a photovoltaic module frame groove. When key 34 and spring 35 are situated within a photovoltaic module frame groove, key 34 can provide a base upon which elements of spring 35 can be supported such that spring clip 36 and lower projections 37 of spring 35 can frictionally interface the top lip and bottom lip, respectively, of that photovoltaic module frame groove.

In operation, and as described in further detail below, fastener 40 adjusts the separation distance between upper body portion 30 and lower body portion 20 of connector 10 such that hook 32 can be lowered to connect into or onto first photovoltaic module 100 prior to second photovoltaic module 200 being slid onto key 34.

As shown in FIGS. 2 to 4, both pairs of arms on lower body portion 20, lower arms 22 and upper arms 24, are dimensioned to be rotated to lock into a groove in a mounting rail. Specifically, lower arms 22 can be received inside groove 52 of mounting rail 50, while upper arms 24 are positioned on top of or above groove 52 in mounting rail 50. (Groove 52 can alternatively be referred to as a top mounting groove or a dorsal mounting groove in order to distinguish from other grooves referenced herein.) Lower body portion 20 can be inserted into groove 52 of mounting rail 50 in an orientation where the relatively narrow dimension of lower arms 22 are parallel with the direction of flanges 51. Once lower arms 22 of lower body portion 20 are within groove, connector 10 can be slid along groove 52 to a position along mounting rail 50 so as to couple to and secure a photovoltaic module. Lower body portion 20 is rotated into a locked position (as seen in FIG. 4) within mounting rail 50. In particular, connector 10 can be rotated ninety degrees (90°), where rounded corners 22a of lower body portion 20 allow for connector 10 to rotate without physically conflicting with the interior walls of groove 52. Conversely, square corners 22b can prevent connector 10 from being rotated past ninety degrees (90°), thereby ensuring that connector 10 in a locked position is aligned to correctly receive and couple to photovoltaic modules. When connector 10 is in a locked position, lower arms 22 are beneath flanges 51 such that connector 10 cannot be lifted out of groove 52. In other words, connector 10 is locked in a z-direction within groove 52. Even in a locked position, however, connector 10 can be slid within and along groove 52 of mounting rail 50.

Optionally, connector 10 can have a visual indicator (e.g. an arrow or notch) molded into a portion of either or both of upper body portion 30 and lower body portion 20. In such aspects, the visual indicator can provide guidance to an installer as to the direction in which connector 10 should be inserted into groove 52 of mounting rail 50.

In some aspects of an overall solar panel array system and mounting system for the same, mounting rail 50 can further include a side mounting groove 53, optionally having ridged flanges, that can couple with structural components of a mounting rail support system.

Mid-body region 25 can be dimensioned to pass between inwardly facing flanges 51 of groove 52 in mounting rail 50. Moreover, mid-body region 25 can be dimensioned to pass between inwardly facing flanges when connector 10 is in either a locked or an unlocked orientation or position. Connector 10 can be rotated from the unlocked position shown in FIG. 2 and FIG. 3 to the locked position shown in FIG. 4 by the installer twisting connector ninety degrees by use of, for example, a wrench to grab onto and rotate torque projection 41. In some aspects, torque projection 41 can be a "Zep connector" such as those manufactured by Zep Solar of San Rafael, Calif.

Next, as shown in FIG. 5 and FIG. 6, rotated connector 10 can be attached onto a side edge of first photovoltaic module 100, as follows. Hook 32 on upper body portion 30 can be dimensioned to be inserted into first side groove 102 in first photovoltaic module 100 when upper body portion 30 is in its raised position (as seen in FIG. 5). In some aspects, first side groove 102 can be within a frame of first photovoltaic module 100. Subsequently, hook 32, and by extension connector 10, can drop down lock into first side groove 102 as upper body portion 30 is moved down to its lowered position (as seen in FIG. 6). In other words, hook 32 of connector 10 can be moved along mounting rail into first side groove 102 of first photovoltaic module 100, and upper body portion 30 can subsequently drop-down such that hook 32 and/or lower incline 31 can secure to first photovoltaic module 100. In some such aspects, the coupled structure of first photovoltaic module 100 and connector 10 can be moved as a single piece along groove 52 of mounting rail 50.

The movement of upper body portion 30 with respect to lower body portion 20 can be accomplished by rotating fastener 40. Fastener 40 can be, for example, a screw, as shown. In some aspects, lower incline 31 can be configured and/or angled to match with and rest upon the lower lip of first side groove 102. Lower incline 31 can have a frictional interface with the lower lip of first side groove 102 when fastener 40 secures upper body portion 30 into a drop down position.

In concert with hook 32 clamping down on the interior lower surface of first side groove 102, tightening connector 10 to first photovoltaic module 100 can also cause lower body portion 20 to be pulled upward from groove 52. Lower body portion 20 will not be pulled out of groove 52 because lower arms 22, being perpendicular to the opening of groove 52, will be physically blocked by flanges 51. Accordingly, due to the upward directed force of lower arms 22 on flanges 51, connector 10 will be further secured to mounting rail 50, and by extension first photovoltaic module 100 will be further secured to mounting rail 50. As such, lower arms 22 can be considered as a nut or washer component to connector 10, aiding in the tightening of upper body portion 30 until first photovoltaic module 100 comes into contact with mounting rail 50. In some aspects, the module load (i.e. the weight) of first photovoltaic module 100 will rest and be primarily supported directly by mounting rail 50. In such aspects, connector 10 does not necessarily bear a significant fraction of the module load of first photovoltaic module 100.

An advantage of this installation approach is the speed and straightforward approach. Simply put, the installer need only rotate fastener 40 and first photovoltaic module 100 will be securely held in position on mounting rail 50. Moreover, connector 10 can be moved to any desired position along mounting rail 50 prior to being rotated into a final locked position. As a result, the installer is free to position the edges of first photovoltaic module 100 and second photovoltaic module 200 at various desired positions along the length of mounting rail 50. This flexibility in arrangement allows for an installer to account for any unique challenges or obstacles on any given roof, avoiding physical conflicts with other object or optimizing solar exposure for the photovoltaic modules of the deployed solar panel array. Moreover, having the top of fastener 40 positioned at the top of connector 10 provides for a relatively easy access point for the installer to adjust the height of upper body portion 30 from above connector 10. Furthermore, upper arms 24 of lower body portion 20 can allow for a grip or handling surface where the installer can manipulate connector 10

After first photovoltaic module 100 has been held and secured in a position along mounting rail 50 by lowering hook 32 of connector 10 within first side groove 102, connector 10 is then ready to receive second photovoltaic module 200 thereon. Specifically, as shown in FIG. 7 and FIG. 8, connector 10 has key 34 as part of upper body portion 30. Key 34 is dimensioned to be inserted straight into second side groove 202 in second photovoltaic module 200 such that second photovoltaic module 200 can be slid onto connector 10 (as seen in FIG. 8). In other words, second side groove 202 of second photovoltaic module 200 can make a slide-in connection with key 34 of connector 10, where second photovoltaic module 200 is moved laterally along mounting rail 50 to couple with connector 10.

Subsequently, key 34 locks into second side groove 202 in second photovoltaic module 200 with the top end of spring clip 36 being compressed when received into groove 202 (e.g., in FIG. 8). Indeed, both spring clip 36 and lower projections 37 of spring 35 can be compressed by the upper lip and lower lip, respectively, of second side groove 202 as second photovoltaic module 200 slides-in onto key 34 of connector 10. Both spring clip 36 and lower projections 37 of spring 35 can expand within the space of second side groove 202, such that connector 10 and second photovoltaic module 200 are secured to each other.

Preferably, connector 10 includes a grounding element as part of spring 35 supported on key 34, thereby grounding second photovoltaic module 200. In particular lower projections 37 of spring 35 (as seen in FIG. 1C) can cut and/or bite into lower lip of groove 202 in the frame of second photovoltaic module 200, thereby making an electrical grounding connection between spring 35 and second photovoltaic module 200. The grounding of second photovoltaic module 200 can be through spring 35, connector 10, and mounting rail 50 to a mounting rail support structure and/or the roof upon which the solar panel array is deployed. In some embodiments, hook 32 and lower incline 31 can also form an electrical connection with first photovoltaic module 100 to establish an electrical grounding path.

Once spring 35 is positioned within second side groove 202, the combination of lower projections 37 cutting into the lower lip of second side groove 202 and spring clip 36 catching onto an upper interior surface of second side groove 202 can secure second photovoltaic module 200 to connector 10. In some aspects, the module load (i.e. the weight) of second photovoltaic module 200 will rest and be primarily supported directly by mounting rail 50. In such aspects, connector 10 does not necessarily bear a significant fraction of the module load of second photovoltaic module 200.

In such photovoltaic array installations, both first photovoltaic modules 100 and second photovoltaic modules 200 of the array can be parallel to mounting rails 50 upon which they are supported.

It can be understood, in the context of the present disclosure, that for any given first electrical photovoltaic module 100, that same photovoltaic module can be considered as a "second" photovoltaic module if connected to a connector 10 on the other side of the photovoltaic module. In other words, each photovoltaic module can have first side groove 102 and second side groove 202, where both side grooves have the same structure, but where the interaction with hook 32 or key 34 and spring 35 of upper body portion 30 of connector 10 defines whether the side groove is considered as first side groove 102 or second side groove 202, in that given context. Accordingly, each photovoltaic module coupled using one or more connectors 10 can be grounded via the electrical connection formed between lower projections 37 and second side groove 202.

An advantage of the present system is that second photovoltaic module 200 can be attached to connector 10 without an installer having to touch connector 10 during the attachment process. As a result, the installer does not have to reach back over installed second photovoltaic module 200 after it has been slidably connected onto key 34 and spring 35 of connector 10. This feature of the present system permits the installer to proceed rapidly along a row of photovoltaic modules installing one module after another while only having to secure connector 10 to a photovoltaic module on one side (i.e.: first photovoltaic module 100) without having to touch or manipulate the connector 10 to install a second photovoltaic module (i.e.: second photovoltaic module 200). When installing a row of modules, the opposite side of second photovoltaic module 200 will be connected into by another hook 32 on another connector 10. Thus, as described above, the second photovoltaic module 200 (as described herein) will become the first photovoltaic module 100 (as described herein) for the next module in the row of a solar panel array.

Optionally, the present system also includes a method of attaching first and second photovoltaic modules 100 and 200 onto mounting rail 50, by inserting lower body portion 20 of connector 10 into groove 52 in mounting rail 50, rotating connector 10 to lock lower body portion 20 into groove 52 in mounting rail 50, inserting hook 32 of upper body portion 30 of connector 10 into first side groove 102 on first photovoltaic module 100, lowering hook 32 down into first side groove 102 in first photovoltaic module 100, thereby securing first photovoltaic module 100 to mounting rail 50, and then slide-locking second photovoltaic module 200 onto key 34 and spring 35 on connector 10, thereby securing second photovoltaic module 200 to mounting rail 50.

Preferably, lowering hook 32 down into first side groove 102 in first photovoltaic module 100 includes the steps of lowering upper body portion 30 down towards lower body portion 20 of connector 10. Upper body portion 30 can be lowered towards lower body portion 30 by rotating fastener 40.

Preferably, slide-locking second photovoltaic module 200 onto key 34 on connector 10 includes the steps of inserting key 34 into second side groove 202 in second photovoltaic module 200 when second photovoltaic module 200 is positioned parallel to the mounting rail (as shown in FIG. 7); and then pushing second photovoltaic module 200 onto key 34 (as shown in FIG. 8).

FIG. 9 shows an added optional feature of the present invention, as follows. In the event that second photovoltaic module 200 is pulled away from connector 10 after installation, the top end of spring clip 36 will tend to resist this motion since it will project upwardly into second side groove 202. This feature of the present system is advantageous when working on sloped roofs. Specifically, as installers work on sloped roofs, they may install photovoltaic modules working down the slope of the roof Therefore, when installing second photovoltaic module 200 onto connector 10, the installer may be pushing second photovoltaic module 200 upwardly towards connector 10. The spring clip 36 on connector 10 will tend to prevent module 200 from sliding off of key 34 on connector 10, particularly as spring clip 36 can catch onto upper lip of second side groove 202.

As represented in FIGS. 5 to 9, connector 10 and upper body portion 30 are illustrated so as to clearly show how upper body portion 30, hook 32, key 34, and spring 35 fit together within first side groove 102 and second side groove 202. It is understood that the size of connector 10 and upper body portion 30 may be sized or dimensioned to more fully fill the spaces defined within first side groove 102 and second side groove 202.

In alternate embodiments of the present disclosure, second photovoltaic module 200 can be pivot connected to key 34 (i.e.: installed at an angle and then rotated downwardly to lock onto key 34). In this approach, the installer would still be able to secure second photovoltaic module 200 directly to connector 10 without having to touch connector 10. As a result, the installer would still not have to reach back over second photovoltaic module 200 after installation onto mounting rail 50.

In alternative aspects of the present system, connector 10 can instead have hooks 32 on both sides of upper body portion 30, with each of hooks 32 on either side lowered into the first side groove 102 and second side groove 202 of first photovoltaic module 100 and second photovoltaic module 200, respectively. In this alternate embodiment, key 34 and its associated spring 35 are eliminated, and connector 10 will instead securely lock into and hold first photovoltaic module 100 and second photovoltaic module 200 at the same time as upper body portion 30 is tightened via fastener 40.

In alternative aspects of the present system, connector 10 can instead have keys 34 on both sides of upper body portion 30, with spring 35 having spring clips 36 extending out along both side of upper body portion 30 to match with keys 34. In such an embodiment, each of keys 34 and spring clips 36 will connect to first side groove 102 and second side groove 202 of first photovoltaic module 100 and second photovoltaic module 200, respectively. In this alternate embodiment, hook 32 is eliminated, and connector 10 will instead securely lock into and hold first photovoltaic module 100 and second photovoltaic module 200 sequentially as each photovoltaic modules makes a slide-in connection with connector 10.

In some aspects of the present system, while connector 10 can be used between first photovoltaic module 100 and second photovoltaic module 200 in subsequent rows of a solar panel array, support for any given row of photovoltaic modules at the edge of the solar panel array can be supported on mounting rails by a variety of structures. In some aspects, only one side of connector 10 (i.e. either hook 32 or key 34 and spring 35) can be utilized to support a photovoltaic module at the edge of a solar panel array. A secondary trim or skirt can be attached to connector 10, or mounted separately and proximate to connector 10, to cover and/or define the outer edge of the solar panel array. In other aspects, an alternative rail mounting structure, such as an end clamp, can be used at the edges of the solar panel array to support photovoltaic modules on mounting rails 50. In some such aspects, the alternative rail mounting structure can be similar to connector 10, but only having either hook 32 structure or key 34 and spring 35 structure to couple with photovoltaic modules.

It can be understood that the order of operations for many installations may require connecting first photovoltaic module 100 with connector 10 via a drop-down connection first, and subsequently connecting second photovoltaic module 200 with connector 10 via a slide-in connection afterward. However, it can be further understood that the order of operations for some installations may initially require connecting second photovoltaic module 200 with connector 10 via a slide-in connection first, and subsequently connecting first photovoltaic module 100 with connector 10 via a drop-down connection afterward.

In some embodiments, the present disclosure is directed to a connector for attaching first and second photovoltaic modules to a mounting rail, having a lower body portion configured to couple with a mounting rail, an upper body portion having a hook and a key extending from opposite sides of the upper body portion, and a fastener connecting the upper body portion onto the lower body portion, where the fastener can adjust the separation distance between the upper and lower body portions of the connector such that the hook can be lowered to connect onto a first photovoltaic module prior to a second photovoltaic module being connected onto the key. In some aspects, the lower body portion can have a pair of lower arms extending from opposite sides of the lower body portion on the bottom of the lower body portion, and a pair of upper arms extending from opposite sides of the lower body portion from the top of the lower body portion.

The pair of upper arms on the lower body portion can be positioned above the pair of lower arms on the lower body portion. The pair of arms on the lower body portion can also be sized to be rotate and lock into a groove in a mounting rail. Further, the pair of lower arms can be received inside the groove in the mounting rail, while the pair of upper arms can be positioned on top of the groove in the mounting rail when the lower body portion is rotated into a locked position within the mounting rail. The lower body portion can include a mid-body portion between the upper and lower arms, where the mid-body portion is size to fit in and pass between inwardly facing flanges of the groove in the mounting rail. The hook on the upper body portion can be dimensioned to be inserted into a side groove in the first photovoltaic module when the upper body portion is raised, and then lock down into the side groove when the upper body portion is in a lowered position. The key on the upper body portion can be dimensioned to be inserted into a side groove in the second photovoltaic module. Further, the key on the upper body portion can be dimensioned to be slidably inserted into the side groove in the second photovoltaic module, such that a spring on the key locks into the side groove in the second photovoltaic module when the second photovoltaic module is pulled away from the connector. In some aspects, the connector can further include a grounding element for grounding the second photovoltaic module. The fastener connecting the upper body portion onto the lower body portion can be a screw passing through the upper body portion into the lower body portion. In such aspects, the head of the screw fastener can be accessible at the top of the upper body portion. The upper body portion can have a torque protrusion extending upwardly dimensioned to be rotated by a tool to rotate the lower body portion of the connector into a locked position in a side groove of a mounting rail. The hook and key can extend in a direction perpendicular to the pairs of upper and lower arms on the lower body portion.

In some embodiments, the present disclosure is directed to a system for connecting two photovoltaic modules on a mounting rail. The system can have a connector, a fastener, a mounting rail, a first photovoltaic modules, and a second photovoltaic module. The connector can be formed from a lower body portion that is configured to couple with a mounting rail, an upper body portion having a hook configured to couple with a photovoltaic module frame via a drop-down connection and a key and a spring configured to couple with a photovoltaic module frame via a slide-in connection. The fastener passes through the lower body portion, the spring, and the upper body portion, and the fastener can be configured to tighten the lower body portion and the upper body portion closer together when rotated. The first photovoltaic module can having a frame with a side groove, and similarly, the second photovoltaic module having a frame with a side groove. The mounting rail can have a top mounting groove, where, when the fastener is tightened, the lower body portion of the connector is secured within the top mounting groove and the hook is secured within the first photovoltaic module frame side groove, and when the second photovoltaic module frame side groove is slid onto the key and the spring the key and the spring are secured within the second photovoltaic module frame side groove.

In some embodiments, the present disclosure is directed to a method of attaching first and second photovoltaic modules onto a mounting rail. The method can include various step, including inserting a lower body portion of a connector into a groove in a mounting rail, rotating the connector to lock the lower body portion into the groove in the mounting rail, inserting a hook on an upper body portion of the connector into a side groove on a first photovoltaic module, lowering the hook on the upper body portion of the connector down into the side groove in the first photovoltaic module, thereby securing the first photovoltaic module to the mounting rail, and then locking a second photovoltaic module onto a key on the connector, thereby securing the second photovoltaic module to the mounting rail. Lowering the hook down into the side groove in the first photovoltaic module can include lowering the upper body portion of the connector down towards the lower body portion of the connector. The upper body portion can be lowered towards the lower body portion by rotating a fastener passing into the upper and lower body portions. The fastener can be a screw that is accessible from the top of the upper body portion. Rotating the connector to lock the lower body portion into the groove in the mounting rail can include rotating a pair of arms on the lower body portion into the groove in the mounting rail. In some aspects, rotating the connector can include rotating a torque protrusion extending upwardly from the upper body portion with a tool. Further, locking the second photovoltaic module onto the key on the connector can include inserting the key into the side groove in the second photovoltaic module when the second photovoltaic module is positioned at an angle to the mounting rail, and then sliding the second photovoltaic module onto the key.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, will be apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A connector for attaching first and second photovoltaic modules to a mounting rail, comprising:
   a lower body portion configured to couple with a mounting rail, wherein a pair of lower arms extend from opposite sides of the lower body portion, and a pair of upper arms extend from opposite sides of the lower body portion, and further wherein the pair of lower arms on the lower body portion are dimensioned to be rotated to lock into a groove in the mounting rail;
   an upper body portion having a hook and a key respectively extending from opposite sides of the upper body portion; and
   a fastener connecting the upper body portion onto the lower body portion, wherein the fastener adjusts a separation distance between the upper and lower body portions of the connector such that the hook can be lowered to connect onto a first photovoltaic module prior to a second photovoltaic module being connected onto the key.

2. The connector of claim 1, further comprising a spring that is in part secured between the lower body portion and the upper body portion, wherein the spring has a spring clip structure that extends around the key.

3. The connector of claim 1, wherein the pair of lower arms is received inside the groove in the mounting rail and the pair of upper arms is positioned on top of the groove in the mounting rail when the lower body portion is rotated into a locked position within the mounting rail.

4. The connector of claim 1, wherein the lower body portion comprises a mid-body portion between the upper and lower arms, and the mid-body portion is dimensioned to pass between inwardly facing flanges of the groove in the mounting rail.

5. The connector of claim 1, wherein the hook on the upper body portion is dimensioned to be inserted into a side groove in the first photovoltaic module when the upper body portion is raised, and then lock down into the side groove when the upper body portion is in a lowered position.

6. The connector of claim 1, wherein the key on the upper body portion is dimensioned to be slidably inserted into the side groove in the second photovoltaic module, and wherein the spring clip structure on the key locks into the side groove in the second photovoltaic module when the second photovoltaic module is pulled away from the connector.

7. The connector of claim 1, further comprising a grounding for grounding the second photovoltaic module.

8. The connector of claim 1, wherein the fastener connecting the upper body portion onto the lower body portion is a screw passing through the upper body portion into the lower body portion.

9. The connector of claim 8, wherein the head of the screw is accessible at the top of the upper body portion.

10. The connector of claim 1, wherein the upper body portion has a torque protrusion extending upwardly dimensioned to be rotated by a tool to rotate the lower body portion of the connector into a locked position in a side groove of a mounting rail.

11. The connector of claim 1, wherein the hook and key extend in a direction perpendicular to the pairs of upper and lower arms on the lower body portion.

12. A system for connecting two photovoltaic modules on a mounting rail, comprising:
 a first photovoltaic module having a frame with a side groove;
 a second photovoltaic module having a frame with a side groove; and
 a mounting rail having a top mounting groove;
 a connector comprising:
  a lower body portion configured to couple with a mounting rail, wherein a pair of lower arms extend from opposite sides of the lower body portion, and a pair of upper arms extend from opposite sides of the lower body portion, and further wherein the pair of lower arms on the lower body portion are dimensioned to be rotated to lock into a groove in the mounting rail;
  an upper body portion having a hook configured to couple with the first photovoltaic module frame by a drop-down connection and a key and a spring configured to couple with the second photovoltaic module frame by a slide-in connection; and
  a fastener passing through the lower body portion, the spring, and the upper body portion, configured to tighten the lower body portion and the upper body portion closer together when rotated;

wherein the lower body portion of the connector is secured within the top mounting groove and the hook is secured within the first photovoltaic module frame side groove when the fastener is tightened, and further wherein the key and the spring are secured within the second photovoltaic module frame side groove when the second photovoltaic module frame side groove is slid onto the key and the spring.

13. A method of attaching first and second photovoltaic modules onto a mounting rail, comprising:
 inserting a lower body portion of a connector into a groove in a mounting rail;
 rotating the connector to lock the lower body portion into the groove in the mounting rail;
 inserting a hook of an upper body portion of the connector into a side groove on a first photovoltaic module, wherein the hook of the upper body portion is dimensioned to be inserted into the side groove in the first photovoltaic module when the upper body portion is raised, and dimensioned to lock down into the side groove when the upper body portion is in a lowered position;
 lowering the hook on the upper body portion of the connector down into the side groove in a first photovoltaic module, thereby securing the first photovoltaic module to the mounting rail; and then
 locking a second photovoltaic module onto a key on the connector, thereby securing the second photovoltaic module to the mounting rail.

14. The method of claim 13, wherein lowering the hook down into the side groove in the first photovoltaic module comprises lowering the upper body portion of the connector down towards the lower body portion of the connector.

15. The method of claim 14, wherein the upper body portion is lowered towards the lower body portion by rotating a fastener passing into the upper and lower body portions.

16. The method of claim 15, wherein the fastener is a screw that is accessible from the top of the upper body portion.

17. The method of claim 13, wherein rotating the connector to lock the lower body portion into the groove in the mounting rail comprises rotating a pair of arms on the lower body portion into the groove in the mounting rail.

18. The method of claim 17, wherein rotating the connector comprises rotating a torque protrusion extending upwardly from the upper body portion with a tool.

19. The method of claim 13, wherein locking the second photovoltaic module onto the key on the connector comprises:
 inserting the key into the side groove in the second photovoltaic module when the second photovoltaic module is positioned at an angle to the mounting rail; and then
 sliding the second photovoltaic module onto the key.

20. The method of claim 13, wherein the key on the connector is on the upper body portion and is dimensioned to be slidably inserted into a side groove in the second photovoltaic module, and wherein a spring clip structure on the key locks into the side groove in the second photovoltaic module when the second photovoltaic module is pulled away from the connector.

* * * * *